United States Patent [19]

Lew

[11] 3,894,615

[45] July 15, 1975

[54] TORQUE DISTRIBUTOR

[76] Inventor: Hyok Sang Lew, 1620 E. Blacklidge Dr., No. 6, Tucson, Ariz. 85719

[22] Filed: Sept. 4, 1973

[21] Appl. No.: 394,127

[52] U.S. Cl. ......................... 185/39; 74/25; 74/437; 185/43; 280/215
[51] Int. Cl. ............................................. F03g 1/00
[58] Field of Search ............... 185/2, 10, 13, 39, 43; 74/25, 661; 280/215

[56] References Cited
UNITED STATES PATENTS

| | | | |
|---|---|---|---|
| 551,867 | 12/1895 | Maggart et al........................ | 185/10 |
| 1,374,797 | 4/1921 | Zaborsky ............................ | 280/215 |
| 2,757,569 | 8/1956 | Isom ................................. | 74/436 X |
| 2,908,356 | 10/1959 | Daarud ............................... | 185/39 |

FOREIGN PATENTS OR APPLICATIONS

| | | | |
|---|---|---|---|
| 441,774 | 1/1936 | United Kingdom................... | 74/436 |

*Primary Examiner*—Allan D. Hermann

[57] ABSTRACT

A torque distributor for redistributing torque on a rotating shaft with respect to the angular positions of rotation is disclosed. A leaved gear and a sprocket including a ratchet wheel built in its hub are affixedly disposed on a first shaft transmitting torque. A second shaft including a first gear engaging the leaved gear and a second sprocket linked to the sprocket having a ratchet wheel by a chain, has a planar spiral spring disposed around second shaft. The inner end of the spiral spring is attached to second shaft and the outer end is constrained. The ratchet wheel included in the sprocket on first shaft allows that sprocket to rotate freely relative to first shaft in the direction opposite to the direction of rotation of first shaft, while it locks that sprocket with first shaft when that gear is rotated in the same direction as that of first shaft. The rotation of first shaft winds the planar spiral spring when one of the gear leaves of the leaved gear engages first gear on second shaft. As a consequence, first shaft transmits a torque less than the torque supplied from the power plant in this phase of rotation. When first gear on second shaft is not engaged by any gear leaf of the leaved gear, the planar spiral spring unwinds itself and a resulting torque is transmitted to first shaft by means of the chain linking second sprocket on second shaft to the sprocket on first shaft having a ratchet wheel. Thus, first shaft transmits a torque greater than the torque supplied from the power plant in this phase of rotation.

9 Claims, 5 Drawing Figures

TORQUE DISTRIBUTOR

The present invention relates to a torque distributing mechanism, and more particularly, to a device boosting the torque on a shaft transmitting power for one or more desired angular positions of rotation.

In order to improve the effciency of machineries, it is often necessary to uniformize the torque on a shaft transmitting power from a power plant to a working plant. For example, the fly-wheel is used in most reciprocal internal combustion engines to uniformize the highly nonuniform torque delivered from pistons to the crankshaft. Although the fly-wheel is the most effective device of uniformizing the torque on a shaft having high rate of rotation, it is inoperative for low rate of rotation because of the lack of inertia torque involved in the fly-wheel. There are many machineries operating on low rate of rotation in industries and daily living, which can be made more efficient by using a torque distributor. For example, a source of difficulty of riding a bicycle uphill is that pedaling generates little torque when the pedals become aligned in the vertical position. The use of a fly-wheel of a particular design or as provided by the wheels of the bicycle does little good in uniformizing the torque delivered to the rear wheel of the bicycle, since the rate of revolution of the bicycle wheel in uphill ride is far too low to make the use of a fly-wheel effective. Riding a bicycle can be made more easy and efficient, especially for uphill riding, when a torque distributor is used to redistribute the torque in such a way that a portion of large torque generated by the pedals in near horizontal position is used to boost the torque when the pedals become aligned in the vertical position. This is one example of obtaining a uniform torque from a nonuniform source of torque by using a torque distributor. A torque distributor can be also used in obtaining a nonuniform torque from a uniform source of torque.

It is therefore a primary object of the present invention to provide a torque distributor, which absorbs a torque from a shaft transmitting torque at an angular position of the rotation and then releases the absorbed torque back to the transmitting shaft at another angular position.

Another object of the present invention is to provide a torque distributor, which operates on all rates of rotation including very low rate of rotation.

Still another object of the present invention is to provide a torque distributor, in which the magnitude of the redistributed torque can be adjusted.

A further object of the present invention is to provide a torque distributor, which can be easily activated or deactivated.

A yet further object of the present invention is to provide a torque distributor, which is mechanically simple and reliable.

A still further object of the present invention is to provide a torque distributor, which can be incorporated into presently available bicycles.

These and other objects of the present invention will become apparent to those skilled in the art as the description thereof proceeds.

The present invention may be described with greater specificity and clarity with reference to the following drawings, in which.

Figure 1:
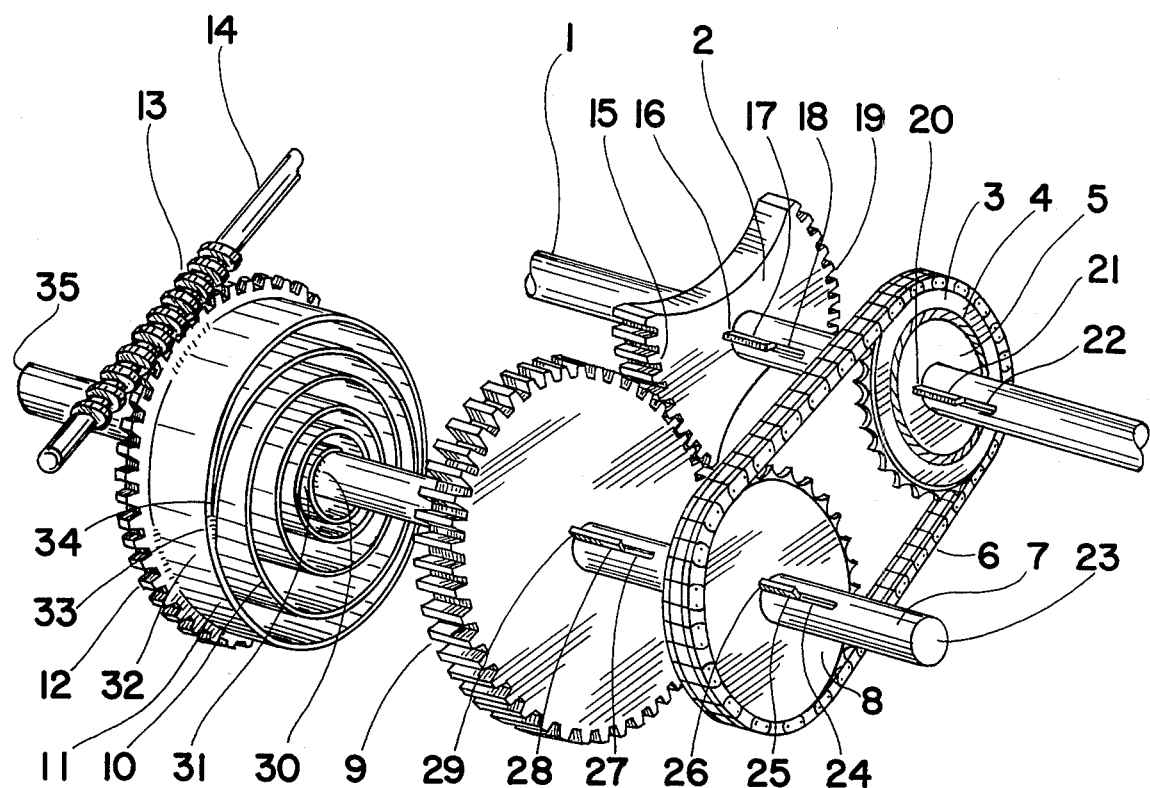
FIG. 1 illustrates a perspective view of the present invention.

Referring to FIG. 1, there is shown a torque distributor constructed in accordance with the present invention. The shaft 1 transmits a torque from a power plant to a working plant. A leaved gear 2 having one or more gear leaves (which is represented by a two leaved gear in the drawing) is affixedly disposed on shaft 1. The fixation means of leaved gear 2 on shaft 1 is demonstrated by a pin 17 engaging a slot formed of two mated grooves 16 and 18 disposed on the hub of leaved gear 2 and the surface of shaft 1, respectively. A sprocket 3 including a ratchet wheel 4 built in hub 5 is similarly disposed on shaft 1 as aided by a pin 21 engaging a slot made of two mated grooves 20 and 22. A shaft 7 is placed next to shaft 1 (journal means disposed at both ends 23 and 35 are not illustrated, since such arrangements are self evident). The sprockets 8 and 9 are affixedly disposed on shaft 7 as aided by pin-slot combinations 25 and 24–26, and, 28 and 27–29, respectively. Sprockets 3 and gear 8 are linked to each other by a chain 6, while gear leaves of leaved gear 2 engage gear 9 as demonstrated by gear leaf 15 engaging gear 9. A planar spiral spring 10 is disposed around shaft 7. The inner end 31 of planar spiral spring 10 is attached to shaft 7 as demonstrated by a fillet 30, while the outer end 34 is affixed to the side 32 of cylindrical container 11 encasing planar spiral spring 10 as demonstrated by a fillet 33. A gear 12 affixedly attached to the base of container 11 is placed on shaft 7 as a hole drilled through the hub of gear 12 and the base of container 11 rotatably engages shaft 7. A worm gear 13 disposed on a shaft 14 engages gear 12 and thus constrains gear 12 from rotating.

The ratchet wheel 4 included in sprocket 3 allows sprocket 3 to rotate freely relative to hub 5 in the direction opposite to the direction of rotation of shaft 1, while it locks sprocket 3 with hub 5 when sprocket 3 is rotated relative to hub 5 in the same direction as that of shaft 1. It is apparent from FIG. 1 and preceding descriptions that the rotation of shaft 1 winds planar spiral spring 10 when one of the gear leaves of leaved gear 2 engages gear 9. The planar spiral spring unwinds itself when gear 9 is not engaged by any gear leaf of leaved gear 2. A portion of torque on shaft 1 is absorbed into planar spiral spring 10 when one of the gear leaves of leaved gear 2 engages gear 9. The torque absorbed by planar spiral spring 10 is released back to shaft 1 when gear 9 is not engaged by any gear leaf of leaved gear 2. Therefore, the torque on shaft 1 is redistributed with respect to the angles of rotation. In order to maintain the magnitude of the redistributed torque at a constant level, the angle wound on the planar spiral spring has to be equal to the angle unwound in each cycle of torque transfer.

Figure 2:
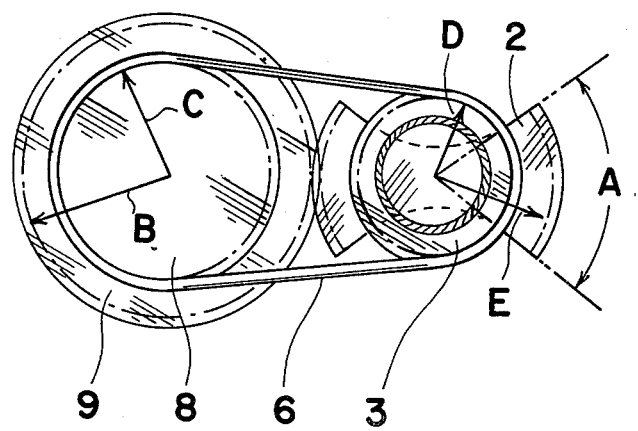
FIG. 2 illustrates an end view of the present invention, showing a geometrical relationship of its construction.

In FIG. 2, there is illustrated an end view of the formulas: Angle Wound=$A \cdot E/B$, Angle Unwound=$(360/n-A) \cdot D/C$ and $A=(360/n)/(C \cdot E/B \cdot D+1)$ shows a geometrical relationship that has to be satisfied in constructing the torque distributor to maintain the magnitude of torque redistribution at a constant level. This formula is for a torque distributor having a n-leaved gear, in which n number of identical gear leaves are disposed in an axisymmetrical pattern. A is the sectoral angle of single gear leaf, B is the radius of gear 9, C is the radius of sprocket 8, D is the radius of sprocket 3 and E is the radius of leaved gear 2. A formula corresponding to that shown can be obtained after simple algebra for a leaved gear having gear leaves disposed asymmetrically, when the geometry of such a leaved gear is prescribed. It should be mentioned that the mechanical tolerance involved in gearing and ratchet mechanisms is not taken into consideration in obtaining the formula mentioned above. The purpose of presenting this formula is to show the feasibility of the construction of a torque distributor rather than to provide a quantitative basis for the design.

Figure 3:
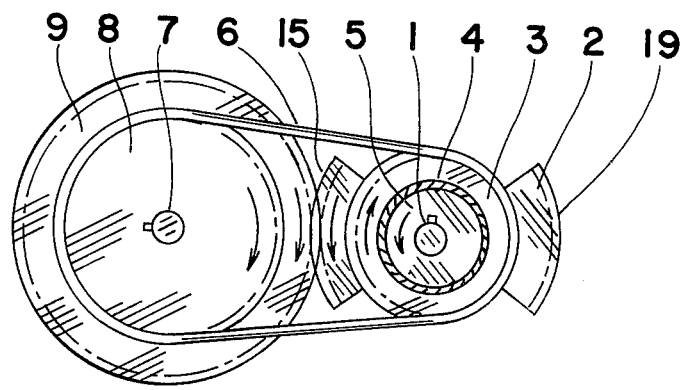
FIG. 3 illustrates an end view of the present invention, showing the process of absorbing the torque.

In FIG. 3, there is shown an end view of the torque distributor illustrated in FIG. 1. This illustration describes the process of winding the planar spiral spring. The rotation of shaft 1 winds planar spiral spring 10(see FIG. 1) as a leaf gear 15 of leaved gear 2 engages gear 9. The chain 6 linking sprocket 8 to sprocket 3 rotates sprocket 3 in the direction opposite to the direction of rotation of shaft 1, which is the same as that of hub 5, as indicated by arrows showing the direction of rotation. Such a rotation of sprocket 3 does not interfere with the winding of planar spiral spring 10 or the rotation of shaft 1, since ratchet wheel 4 allows sprocket 3 to rotate freely in that direction. In this phase of rotation, a portion of torque on shaft 1 is spent to wind planar spiral spring 10 and, consequently, the resultant torque transmitted by shaft 1 is less than the torque supplied to shaft 1 from the power plant.

Figure 4:
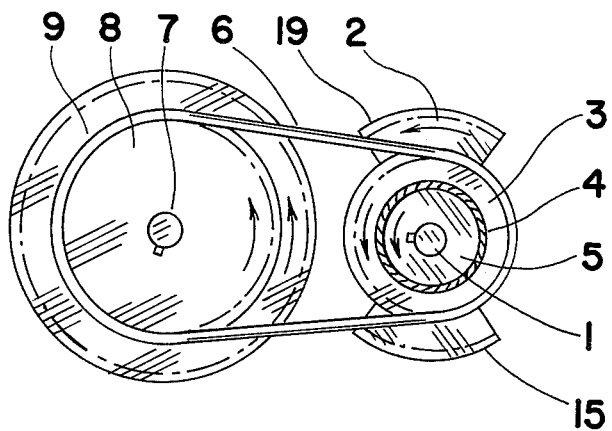
FIG. 4 illustrates an end view of the present invention, showing the process of releasing the torque.

In FIG. 4, there is illustrated the same end view of the present invention as that shown in FIG. 3, but in a different phase of rotation. In this phase of rotation, none of the gear leaves of leaved gear 2 engages gear 9 and, consequently, planar spiral spring 10 unwinds itself. The torque released from the unwinding planar spiral spring is transmitted back to shaft 1 as chain 6 linking sprocket 8 to sprocket 3 rotates shaft 1 in the same direction as that of shaft 1. In such a rotation of sprocket 3, ratchet wheel 4 locks sprocket 3 with hub 5 and thus all of the torque released by planar spiral spring 10 is transmitted to shaft 1. The resultant torque transmitted by shaft 1 is greater than the torque supplied to shaft 1 from the power plant in this phase of rotation.

The principles of operation of the present invention becomes apparent from the preceding description. Referring again to FIG. 1, the magnitude of the torque redistribution can be adjusted by rotating shaft 14 in either direction. When shaft 14 is rotated, worm gear 13 engaging gear 12 turns container 11 and, thus, winds or unwinds planar spiral spring to increase or decrease the magnitude of the torque redistribution by the torque distributor. The torque distributor can be completely deactivated by disengaging worm gear 13 from gear 12. It is obvious that the torque distributor can be used in uniformizing as well as non-uniformizing the torque. A combination of more than one torque distributor may be used to obtain a desired distribution of torque with respect to the angles of rotation. The use of a torque distributor in conjunction with a bicycle is particularly interesting. Uphill ride of a bicycle is made difficult by the fact that the pedaling generates little torque when the pedals are in near vertical position. If a portion of torque generated by pedaling when the pedals are aligned in near horizontal position, is stored and, then, used to boost the torque when the pedals become aligned vertically, riding uphill on a bicycle can be made much easier.

Figure 5:
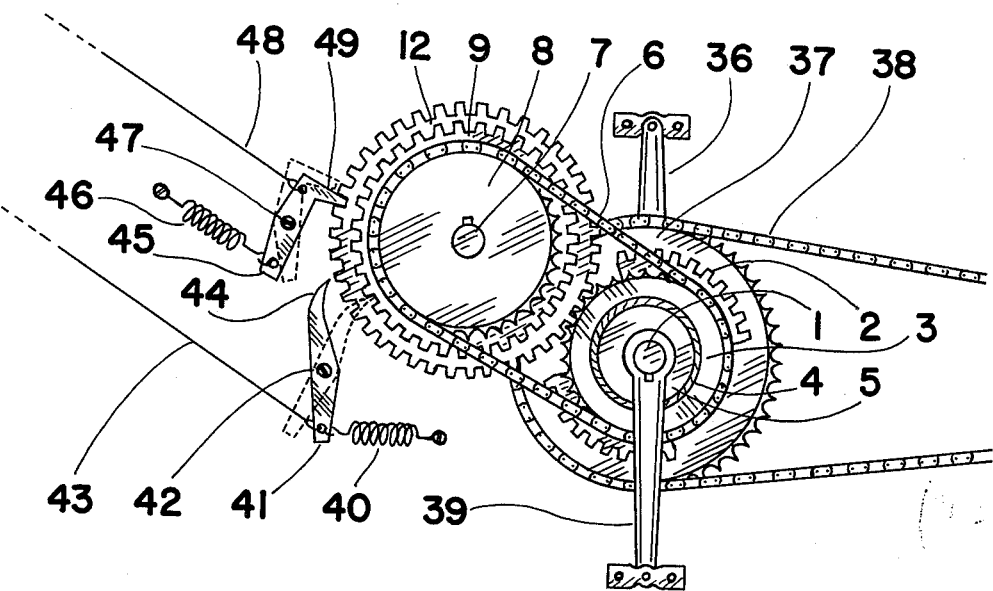
FIG. 5 illustrates another embodiment of the present invention, showing its use in conjunction with a bicycle.

In FIG. 5, there is illustrated the torque distributor of the present invention, which is incorporated to a bicycle. The pedal shaft from which a pair of pedals 36 and 39 extending in two opposing directions, respectively, constitutes shaft 1. The sprocket 37 driving the rear wheel of the bicycle by means of a chain 38 is affixedly disposed on shaft 1 in the same manner as an ordinary bicycle. Two gear leaves symmetrically disposed on leaved gear 2 is aligned in such a way that the engagement between leaved gear 2 and gear 9 becomes established when the pedals 36 and 39 are moved to near horizontal position, while the disengagement of those gears takes place when the pedals are turned to near vertical position. By such an arrangement, a portion of large torque generated by pedaling when the pedals are in near horizontal position is stored in the planar spiral spring and then released to boost the torque when the pedals are turned to near vertical position. A locking mechanism 45 and a ratchet mechanism 41 are embodied to replace worm gear 13(see FIG. 1). Beak 49 of locking mechanism 45 engages gear 12 in the urge of spring 46 and thus restrains gear 12 from rotating. By pulling wire 48 and thus pivoting locking mechanism 45 about hinge 47 to a position outlined by broken lines, one can remove the constraint on gear 12 and let the planar spiral spring unwind itself. By pulling the locking mechanism to the neutral position and maintaining that position, one deactivates the torque distributor. Locking mechanism 45 can be also used to partially unwind the planar spiral spring to lower the level of operation of the torque distributor by employing a quick pull and release of wire 48. Ratchet mechanism 41 stays in the neutral position as urged by spring 40. When wire 43 is pulled and thus pivoting ratchet mechanism 41 about hinge 42 to a position outlined by broken lines, beak 44 engages gear 9. Such an engagement restrains gear 9 from rotating in the direction of unwinding the planar spiral spring, while it does not effect the rotation of gear 9 in the direction of winding the planar spiral spring. Therefore, one can wind the planar spiral spring and thus raise the level of operation of the torque distributor by rotating shaft 1 by pedaling while maintaining a pull on wire 43 in a resilient manner. By manipulating the locking mechanism and the ratchet mechanism properly, one can adjust the magnitude of the torque redistribution to any desired level while continuing the bicycle ride.

While the principles of the invention have now been made clear in an illustrative embodiment, there will be immediately obvious to those skilled in the art many modifications of structures, arrangement, proportions, the elements, materials and components used in the practice of the invention which are particularly adapted for specific environments and operating requirements without departing from those principles.

I claim:

1. A torque distributor for redistributing torque on a shaft transmitting torque, said torque distributor comprising:
   a. a leaved gear including one or more gear leaves affixedly disposed on a first shaft; whereby, revolution of said first shaft rotates said leaved gear;

b. a first gear engaging gear leaves of said leaved gear affixedly disposed on a second shaft; whereby, rotation of said first shaft in one direction rotates said second shaft in the direction opposite to said direction of rotation of said first shaft whenever one of the gear leaves of said leaved gear engages said first gear;

c. a means of absorbing, storing and releasing mechanical energy, connected to said second shaft, said means including:
1. means of absorbing and storing energy when said second shaft is rotated in a first direction; whereby, said means of storing energy absorbs energy from said first shaft when said leaved gear engages and rotates said first gear in said first direction; and
2. means of releasing said absorbed energy to said second shaft when said second shaft is allowed to rotate in a second direction as said leaved gear disengages said first gear, said second direction of rotation being the reverse of said first direction of rotation; whereby, the released energy generates a torque on said second shaft in said second direction.

2. The combination as set forth in claim 1 wherein said first and second shaft include means of transmitting said torque on said second shaft in said second direction generated by said stored energy back to said first shaft.

3. The combination as set forth in claim 2 wherein said means of transmitting said torque from said second shaft to said first shaft including:
a. a first sprocket affixedly disposed on said second shaft;
b. a second sprocket rotatably disposed on said first shaft;
c. a chain linking said first sprocket to said second sprocket; whereby, rotation of said second shaft in one direction rotates said second sprocket in the same direction as said direction of rotation of said second shaft; and
d. a ratchet means locking said second sprocket with said first shaft when said second shaft rotates in said second direction, while said ratchet means does not inhibit rotation of said second sprocket relative to said first shaft when said second shaft rotates in said first direction.

4. The combination as set forth in claim 3 wherein the energy stored in said mechanical means returns to the same amount after each complete cycle of energy absorption and release.

5. The combination as set forth in claim 4 wherein said mechanical means of storing energy includes means of adjusting the amount of energy stored.

6. The combination as set forth in claim 5 wherein said mechanical means of storing energy comprises:
a. a planar spiral spring disposed around said second shaft, the inner end of said planar spiral spring affixed to said second shaft;
b. a cylindrical container encasing said planar spiral spring, the outer end of said planar spiral spring being affixed to the side wall of said cylindrical container;
c. a second gear affixedly attached to the base of said cylindrical container;
d. a hole bored through the center of said second gear and said base; whereby, said second shaft engages said hole rotatably; and
e. a means of constraining and turning said second gear, whereby, the amount of energy stored in said planar spiral spring can be adjusted.

7. The combination as set forth in claim 6 wherein a worm gear engaging said second gear constitutes said means of adjusting the amount of energy stored in said planar spiral spring.

8. The combination as set forth in claim 6 wherein said means of adjusting the amount of energy stored in said planar spiral spring comprises:
a. a locking pin engaging said second gear urged by a first spring, whereby, restraining said second gear from rotating;
b. a first control means attached to said locking pin, movement of said control means against the urge of said first spring disengages said locking pin from said second gear, whereby, allowing said planar spiral spring to unwind itself;
c. a ratchet pin kept disengaged from said first gear by the urge of a second spring; and
d. a second control means attached to said ratchet pin, movement of said second control means against the urge of said second spring engages said ratchet pin with said first gear; whereby, restraining said first gear from rotating in said second direction, while said ratchet pin does not inhibit the rotation of said first gear in said first direction.

9. The combination as set forth in claim 3 wherein a ratchet wheel included in the hub of said second sprocket constitutes said ratchet means, said hub of said second sprocket being affixed to said first shaft.

* * * * *